BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 19, 1968

856 O.G. 669

T 856,025

647,220

1 - AMINO - 2 - (2' - HYDROXY - TRIMETHYLOL - CYCLOHEXYLMETHOXY)-4-HYDROXY-ANTHRAQUINONES

Ralph R. Giles, % Tennessee Eastman Company, P.O. Box 511, Kingsport, Tenn. 37662

Continuation-in-part of application Ser. No. 398,092, Sept. 21, 1964. This application June 19, 1967. Published Nov. 19, 1968

Class 260—380

No Drawing. 5 Pages Specification

Water-insoluble 1-amino-4-hydroxyanthraquinone compounds, substituted at the 2-position with a substituted methoxy group derived from a tetramethylolcyclohexanol, are useful as dyes for hydrophobic textile materials.